United States Patent
Baldwin et al.

(10) Patent No.: US 9,298,386 B2
(45) Date of Patent: Mar. 29, 2016

(54) SYSTEM AND METHOD FOR IMPROVED PLACEMENT OF BLOCKS IN A DEDUPLICATION-ERASURE CODE ENVIRONMENT

(71) Applicant: GlobalFoundries Inc., Grand Cayman (KY)

(72) Inventors: Duane M. Baldwin, Mantorville, MN (US); John T. Olson, Tucson, AZ (US); Sandeep R. Patil, Pune (IN); Riyazahamad M. Shiraguppi, Pune (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 238 days.

(21) Appl. No.: 13/975,152

(22) Filed: Aug. 23, 2013

(65) Prior Publication Data
US 2015/0058583 A1 Feb. 26, 2015

(51) Int. Cl.
G06F 12/00 (2006.01)
G06F 3/06 (2006.01)

(52) U.S. Cl.
CPC .............. *G06F 3/0641* (2013.01); *G06F 3/067* (2013.01); *G06F 3/0619* (2013.01)

(58) Field of Classification Search
CPC ...... G06F 3/0641; G06F 3/0619; G06F 3/067
USPC .................................. 711/144, 162, 206, 216
See application file for complete search history.

(56) References Cited

U.S. PATENT DOCUMENTS

| 7,747,584 | B1 * | 6/2010 | Jernigan, IV | 707/692 |
| 7,962,706 | B2 | 6/2011 | Davis | |
| 7,992,037 | B2 | 8/2011 | Dubnicki et al. | |
| 8,051,362 | B2 | 11/2011 | Li et al. | |
| 8,108,638 | B2 | 1/2012 | Kishi | |
| 8,478,951 | B1 * | 7/2013 | Healey et al. | 711/161 |
| 2006/0277347 | A1 * | 12/2006 | Ashmore et al. | 710/313 |
| 2008/0005141 | A1 * | 1/2008 | Zheng et al. | 707/101 |
| 2009/0235022 | A1 | 9/2009 | Bates et al. | |
| 2009/0271402 | A1 | 10/2009 | Srinivasan et al. | |
| 2011/0185149 | A1 | 7/2011 | Gruhl et al. | |
| 2012/0017054 | A1 * | 1/2012 | Arai et al. | 711/154 |

(Continued)

OTHER PUBLICATIONS

Li et al., "Reliability Analysis of Deduplicated and Erasure-Coded Storage," HP Laboratories, HPL-2010-146, Published in HotMetrics 2010, Jun. 18, 2010, pp. 1-6.

(Continued)

Primary Examiner — Reba I Elmore

(57) ABSTRACT

In one embodiment, a method includes receiving a block set including one or more blocks, generating a hash value for each block in the block set, and determining whether physical blocks stored on computer readable storage media are duplicates of any block in the block set. For each block in the block set having a duplicate, the method includes mapping the block to the duplicate when the duplicate is on one of the computer readable storage media that does not have any other block in the block set written and/or mapped thereto, and writing the block to one of the computer readable storage media that does not have any other block in the block set written and/or mapped thereto when the duplicate is stored on a computer readable storage media that has another block in the block set written and/or mapped thereto, and map the duplicate to the written block.

20 Claims, 13 Drawing Sheets

(56) References Cited

U.S. PATENT DOCUMENTS

2014/0136760 A1* 5/2014 Sprouse et al. ............... 711/103
2014/0136763 A1* 5/2014 Li et al. ......................... 711/103

OTHER PUBLICATIONS

Deshpande, Amey S., "Online Erasure Coding in Distributed Storage Systems," Thesis, North Carolina State University, 2010, pp. 1-50.
Bowers, Kevin D. et al., "How to Tell if Your Cloud Files Are Vulnerable to Drive Crashes," Proc. of the 18th ACM Conference on Computer Communications Security, CCS'11, Oct. 17-21, 2011, Chicago, IL, ACM, 2011, pp. 501-514.
Venkatesan, V et al., "Effect of Codeword Placement on the Reliability of Erasure Coded Data Storage Systems," Research Report, IBM Research—Zurich, RZ 3827 (#ZUR1208-013), Aug. 29, 2012, 27 pages.
"Data deduplication," Wikipedia, Apr. 4, 2013, pp. 1-7.

* cited by examiner

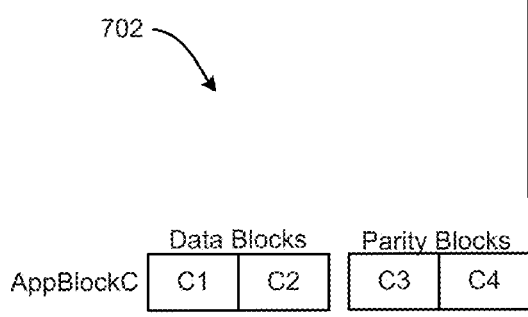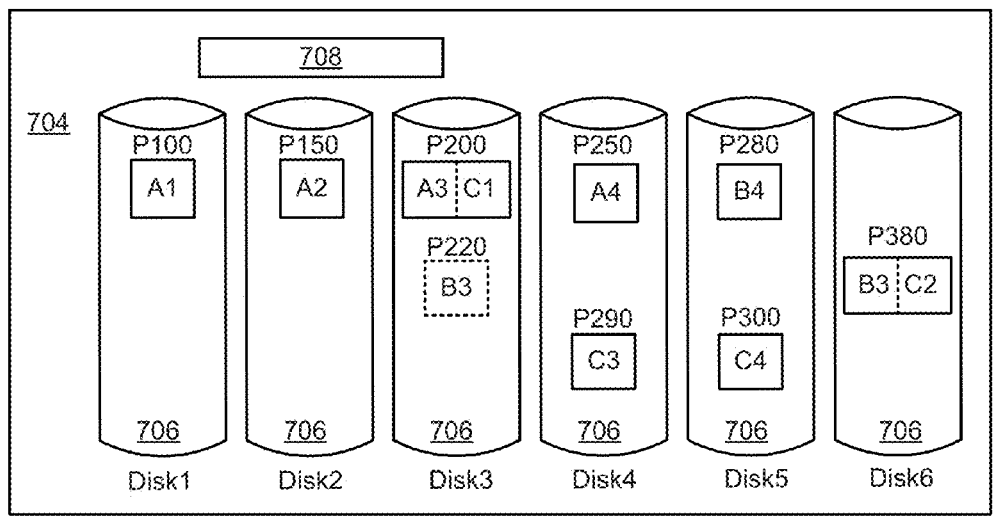
FIG. 7C

| PhyBlockID | Status | Hash Value | Application blocks referring/pointing to PhyBlock | DiskID |
|---|---|---|---|---|
| 0 | Allocated | 1123da12e34 | AppBlock0<br>AppBlock100 | 1 |
| 1 | Allocated | 345b5689dac | AppBlock1<br>AppBlock3 | 1 |
| 2 | Allocated | 6785456ecfba | AppBlock2 | 2 |
| 3 | Freed | ... | ... | ... |
| ... | | | | |
| 100 | Allocated | 378916854abc | AppBlock4<br>AppBlock5 | 3 |
| 101 | Freed | ... | ... | ... |
| ... | | | | |
| 200 | Freed | ... | ... | ... |

FIG. 9

| DiskID | Disk Affinity Values |
|---|---|
| 1 | 0,4,2,6 |
| 2 | 1,5,3,7 |
| 3 | 2,6,4,0 |
| 4 | 3,7,5,1 |
| 5 | 4,0,6,2 |
| 6 | 5,1,7,3 |
| 7 | 6,2,0,4 |
| 8 | 7,3,1,5 |

FIG. 12

```
AffinityFormula Function
(Block d1, ExcludeArray excludeDiskArray[])

{
  int I = 0;
  int totalDisks= totalNoOfDisks in storage Pool.
  int maxAffinity = maximum affinity values a disk can have.
  long d1 = convertDataToNumber(d1);
  int requiredAffinity = d1 mod (totalNoOfDisks-1);
  Boolean affinityFound=false;
  int diskIDFound = -1;

for (j=1; J<= maxAffinity; j++)
  {
    for( i=1;j<= totalNoOfDisks;j++)
    {
      // Check if disk[I] is not part of excludeDiskArray.
      // Continue further if its not. Otherwise check for next disk.
      // Read disk[I] entry from Table2.
      // This entry is in the form of comma separated affinity values.
      // Convert it into dAffinityArray if(dAffinityArray[J]== requiredAffinity)
      {
        diskIDFound = I; affinityFound = true;
        break;
      }
    }
    // If affinityFound flag is set exit the loop
    if (affinityFound == true)
    break;
  } if (affinityFound == true)
    return diskIDFound;

// Otherwise return any disk arbitrarily from the storage pool
  // which is not in excludeArray.

} // End of Function AffinityFormula function
```

FIG. 11

SYSTEM AND METHOD FOR IMPROVED PLACEMENT OF BLOCKS IN A DEDUPLICATION-ERASURE CODE ENVIRONMENT

BACKGROUND

The present invention relates to data storage, and more specifically, this invention relates to systems, computer program products and methods for improving the placement of blocks, e.g. data blocks and parity blocks, in a deduplication-erasure code environment while ensuring/preserving erasure code semantics.

Data deduplication is a storage concept involving the elimination or reduction of redundant/duplicate data stored or communicated in a data storage system. Accordingly, data deduplication facilitates a reduction in storage requirements as only unique data is stored.

Data deduplication may be performed on in-band traffic, e.g. in real time as data is being communicated and/or written to a storage device, and is referred to as inline deduplication. Data deduplication may also occur in post-processing, which occurs after data is transferred to and/or stored upon a storage device. While post-processing data deduplication may shorten the time for data transfer, it requires a full backup to be stored temporarily, thus defeating the storage benefits of deduplication.

Additionally, data deduplication may be performed at the file or at the block (e.g. sub-file) level, thereby defining the minimal data fragment that is checked for redundancy. File level deduplication typically eliminates identical files within or across systems. Conversely, block deduplication looks within a file and saves unique iterations of each block or bit. For instance, with block level deduplication, a file may be split into blocks before being written to and/or stored upon a storage device, and each individual block associated with the file that is found to be a duplicate (e.g. redundant) may be deduplicated.

As mentioned above, in conventional deduplication techniques, an incoming data segment may be divided into sub-units of a desired granularity, e.g. blocks, files, etc. A hash value for each defined sub-unit may then be calculated, where each hash value uniquely identifies the data content of its respective sub-unit. The calculated hash values may then be compared to hash values for existing sub-units already stored in the data storage system, e.g. stored in a storage pool comprising one or more storage devices. For each sub-units having duplicate thereof (e.g. a file or block whose calculated hash value matches a hash value for a stored file or block, respectively), the data storage system may store and/or communicate a reference to the stored sub-unit instead of communicating and/or storing the duplicate sub-unit. Non-duplicate sub-units, e.g. sub-units whose calculated hash values do not match any hash values for the stored sub-units, may be communicated and/or stored to one or more storage devices in the data storage system.

However, deduplication techniques may alter the reliability of data segments. For example, the reliability of a given data segment is based on the reliability of its constituent sub-units, e.g. files, blocks, etc., which may be divided across a plurality of storage devices. Accordingly, data storage systems may implement certain recovery schemes to ensure efficiency (e.g. with regard to the amount of any extra data generated) and reliability (e.g. the extent to which the recovery scheme can recover and/or access lost or compromised data).

Replication is one such recovery scheme, where data is replicated two, three, or more times to different storage devices in the data storage system. A disadvantage with the replication technique is the cost of storing replicate data. Large storage costs may translate to high costs in hardware, as well as high costs in operating the storage system, e.g. cooling, maintenance, etc. Moreover, preserving reliability with known replication schemes may not be effective. For instance, suppose an application block is divided into 4 original blocks (A1, A2, A3, A4) that will be placed on 4 disks. After one replication, 4 replicate blocks (A1$_{copy}$, A2$_{copy}$, A3$_{copy}$, A4$_{copy}$) will be placed on 4 additional disks. If the disk storing an original block, e.g. A1, and a disk storing its replicate, e.g. A1$_{copy}$, both failed, the data associated with the entire application block would be lost, in other words, this exemplary replication scheme may not be able to sustain more than one disk failure.

Another recovery scheme utilizes redundancy parity encoding, which involves the creation/implementation of erasure codes. Redundancy parity encoding typically involves encoding an original data segment in such a way as to generate and embed data redundancies within the data segment. If the data segment is compromised or lost, e.g. from a disk failure, these redundancies would allow recovery of the data or portions thereof. For example, consider a data segment that is divided into m original data blocks. An erasure code, a forward error correction code (FEC) for a binary erase channel, encodes these m original data blocks into n total blocks, where n>m. Thus, the data segment includes the m original data blocks and n−m parity blocks. The erasure code encoding rate (ER) is given by ER=m/n<1. The key property of erasure codes is that all original data can be recovered when there is no more than n−m failures. Stated another way, if any of the n blocks is corrupted, m is the number of verified blocks required to reconstruct/recover the original data. Accordingly, erasure codes provide redundancy without the overhead of strict replication.

BRIEF SUMMARY

According to one embodiment, a method includes receiving a block set including one or more blocks, where the block set is referenced by an application block, generating a hash value for each of the blocks in the block set, and determining whether physical blocks stored on computer readable storage media are duplicates of any of the blocks in the block set. A duplicate physical block is a physical block that has a hash value matching a generated hash value. For each block in the block set that has a duplicate thereof, the method includes mapping the block to the duplicate thereof when the duplicate is on one of the computer readable storage media that does not have any other block in the block set written and/or mapped thereto, and writing the block to one of the computer readable storage media that does not have any other block in the block set written and/or mapped thereto when the duplicate of the block is stored on a computer readable storage media that has another block in the block set written and/or mapped thereto, and map the duplicate to the written block.

According to another embodiment, a system includes a plurality of computer readable storage media, and a deduplication engine, the deduplication engine including a processor and logic integrated with and/or executable by the processor. The logic is configured to cause the processor to receive a block set comprising one or more blocks, generate a hash value for each of the blocks in the block set, and determine whether physical blocks stored on computer readable storage media are duplicates of any of the blocks in the block set. A duplicate physical block is a physical block that has a hash value matching a generated hash value. For each block in the block set that does not have a duplicate thereof, the logic is configured to cause the processor to write the block to one of the computer readable storage media that does not have any other block in the block set written and/or mapped thereto. For each block in the block set that has a duplicate thereof, the logic is configured to cause the processor to map the block to the duplicate thereof when the duplicate is on one of the computer readable storage media that does not have any other block in the block set written and/or mapped thereto, and write the block to one of the computer readable storage media that does not have any other block in the block set written and/or mapped thereto when the duplicate of the block is stored on a computer readable storage media that has another block in the block set written and/or mapped thereto, and map the duplicate to the written block.

According to yet another embodiment, a method includes obtaining information about a block set, where the information comprises one or more data blocks and one or more parity blocks in the block set, generating a hash value for each of the blocks in the block set, and creating a non-duplicate list, a duplicate list, and a mapping list. The method also includes determining whether physical blocks stored on computer readable storage media are duplicates of any of the blocks in the block set, where a duplicate physical block is a physical block that has a hash value matching a generated hash value. For each block in the block set that does not have a duplicate physical block, the method includes adding the block to the non-duplicate list. For each block in the block set that has a duplicate physical block, the method includes adding the duplicate physical block and the computer readable storage medium on which the duplicate physical block is stored to the mapping list, determining whether the computer readable storage medium on which the duplicate physical block is stored is in the duplicate list, and in response to determining that the computer readable storage medium on which the duplicate physical block is stored is not in the duplicate list, adding the block, the duplicate physical block and the computer readable storage medium on which the duplicate physical block is stored to the duplicate list. The method additionally includes outputting the non-duplicate list and the duplicate list.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 7A-7C graphically illustrates a method for improving the placement of blocks in a deduplication-erasure code environment according to one embodiment.

FIG. 9 illustrates an exemplary mapping table according to one embodiment.

FIG. 11 illustrates an exemplary affinity function according to one embodiment.

FIG. 12 illustrates an exemplary disk affinity value table according to one embodiment.

DETAILED DESCRIPTION

Figure 1:
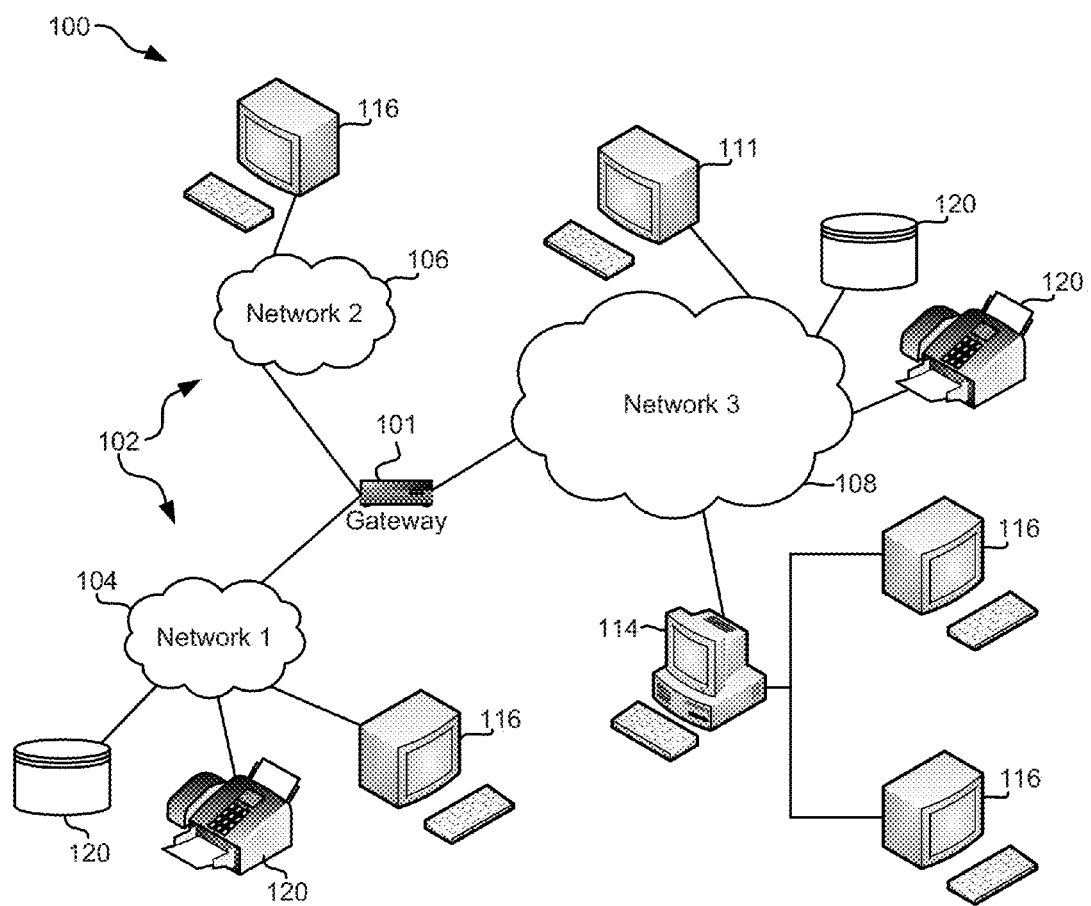
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and the include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, an application block may refer to a data segment that is received and/or processed by any suitable component of the operating environment. For instance, in some approaches an application may send a data segment, i.e. an application block, to a suitable component in a data storage system. Thus, in some approaches the application block may be sent to (and received by) a deduplication layer, a storage pool, etc. or other suitable component of a data storage system as would be understood by one having skill in the art upon reading the present disclosure.

The following description discloses several preferred embodiments of systems, computer program products and methods for improving the placement of blocks, e.g. data blocks and parity blocks, in a deduplication-erasure code environment while ensuring/preserving erasure code semantics. For example, in several preferred embodiments, improved placement of blocks in a deduplication environment while ensuring erasure code semantics may include preserving disparate locations for the blocks.

In one general embodiment, a method includes receiving a block set including one or more blocks, where the block set is referenced by an application block, generating a hash value for each of the blocks in the block set, and determining whether physical blocks stored on computer readable storage media are duplicates of any of the blocks in the block set. A duplicate physical block is a physical block that has a hash value matching a generated hash value. For each block in the block set that has a duplicate thereof, the method includes mapping the block to the duplicate thereof when the duplicate is on one of the computer readable storage media that does not have any other block in the block set written and/or mapped thereto, and writing the block to one of the computer readable storage media that does not have any other block in the block set written and/or mapped thereto when the duplicate of the block is stored on a computer readable storage media that has another block in the block set written and/or mapped thereto, and map the duplicate to the written block.

In another general embodiment, a system includes a plurality of computer readable storage media, and a deduplication engine, the deduplication engine including a processor and logic integrated with and/or executable by the processor. The logic is configured to cause the processor to receive a block set comprising one or more blocks, generate a hash value for each of the blocks in the block set, and determine whether physical blocks stored on computer readable storage media are duplicates of any of the blocks in the block set. A duplicate physical block is a physical block that has a hash value matching a generated hash value. For each block in the block set that does not have a duplicate thereof, the logic is configured to cause the processor to write the block to one of the computer readable storage media that does not have any other block in the block set written and/or mapped thereto. For each block in the block set that has a duplicate thereof, the logic is configured to cause the processor to map the block to the duplicate thereof when the duplicate is on one of the computer readable storage media that does not have any other block in the block set written and/or mapped thereto, and write the block to one of the computer readable storage media that does not have any other block in the block set written and/or mapped thereto when the duplicate of the block is stored on a computer readable storage media that has another block in the block set written and/or mapped thereto, and map the duplicate to the written block.

In yet another general embodiment, a method includes obtaining information about a block set, where the information comprises one or more data blocks and one or more parity blocks in the block set, generating a hash value for each of the blocks in the block set, and creating a non-duplicate list, a duplicate list, and a mapping list. The method also includes determining whether physical blocks stored on computer readable storage media are duplicates of any of the blocks in the block set, where a duplicate physical block is a physical block that has a hash value matching a generated hash value. For each block in the block set that does not have a duplicate physical block, the method includes adding the block to the non-duplicate list. For each block in the block set that has a duplicate physical block, the method includes adding the duplicate physical block and the computer readable storage medium on which the duplicate physical block is stored to the mapping list, determining whether the computer readable storage medium on which the duplicate physical block is stored is in the duplicate list, and in response to determining that the computer readable storage medium on which the duplicate physical block is stored is not in the duplicate list, adding the block, the duplicate physical block and the computer readable storage medium on which the duplicate physical block is stored to the duplicate list. The method additionally includes outputting the non-duplicate list and the duplicate list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system," For example, one approach may include a processor and logic integrated with and/or executable by the processor, the logic being configured to perform various operations. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a on-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, tap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
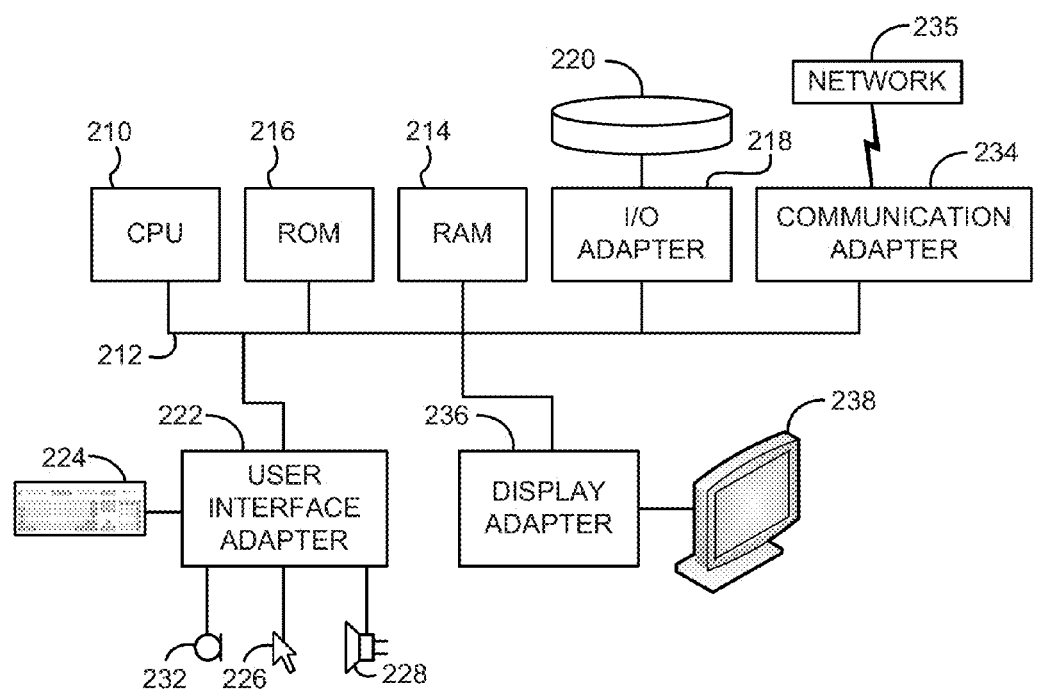
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
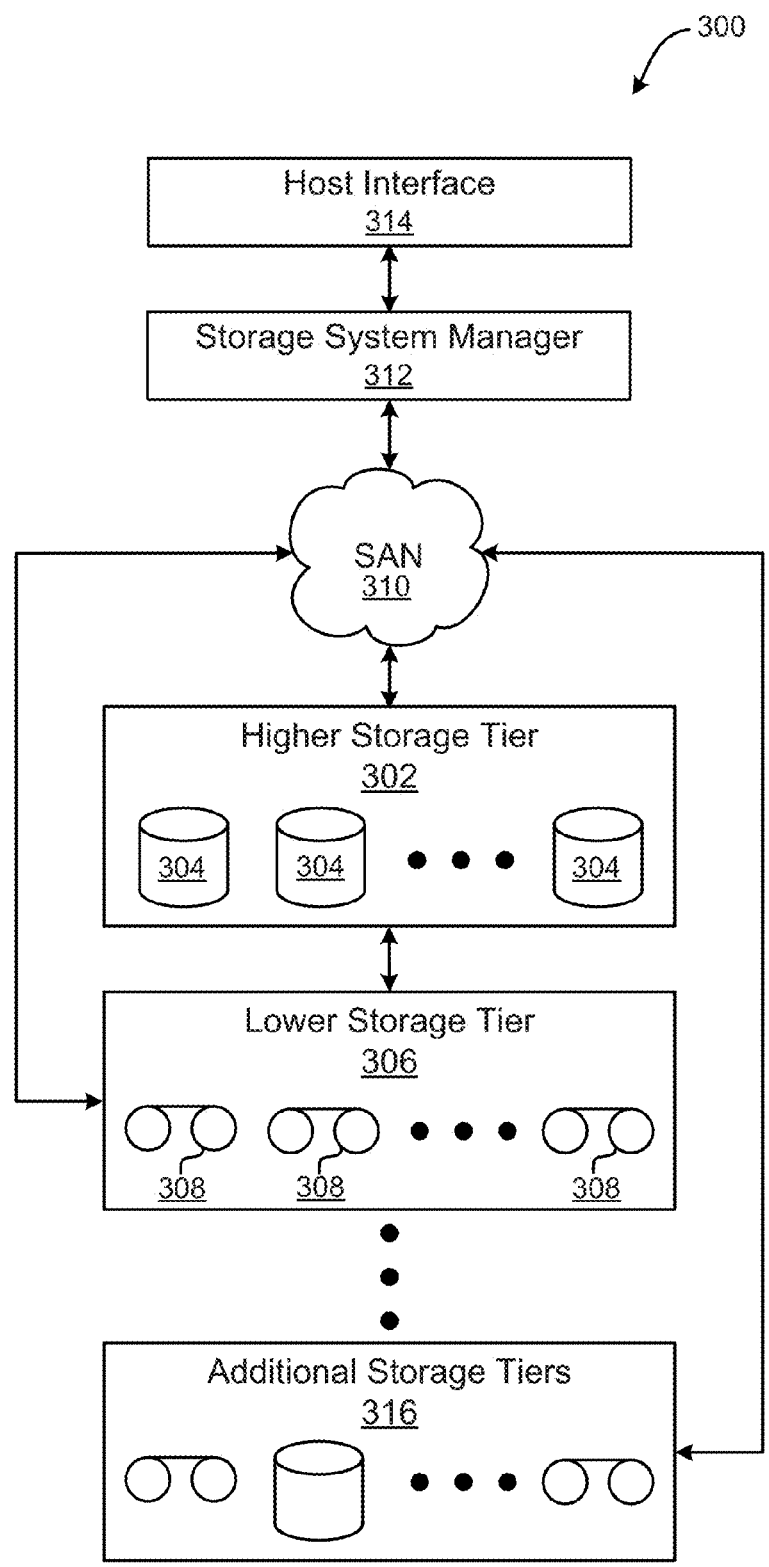
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. In some approaches, the storage system 300 may include a Redundant Array of Independent Disks (RAID) system, or other known storage management system as would be understood by one having skill in the art upon reading the present disclosure.

As shown in FIG. 3, the storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be apart of the storage system manager 312. The storage system manager 312 and/or any other component of the storage system 300 may be implemented in hardware and/or software, and may make use of a processor (not shown) for executing commands of a type known in the art, such as a central processing unit (CPU), afield programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Figure 4:
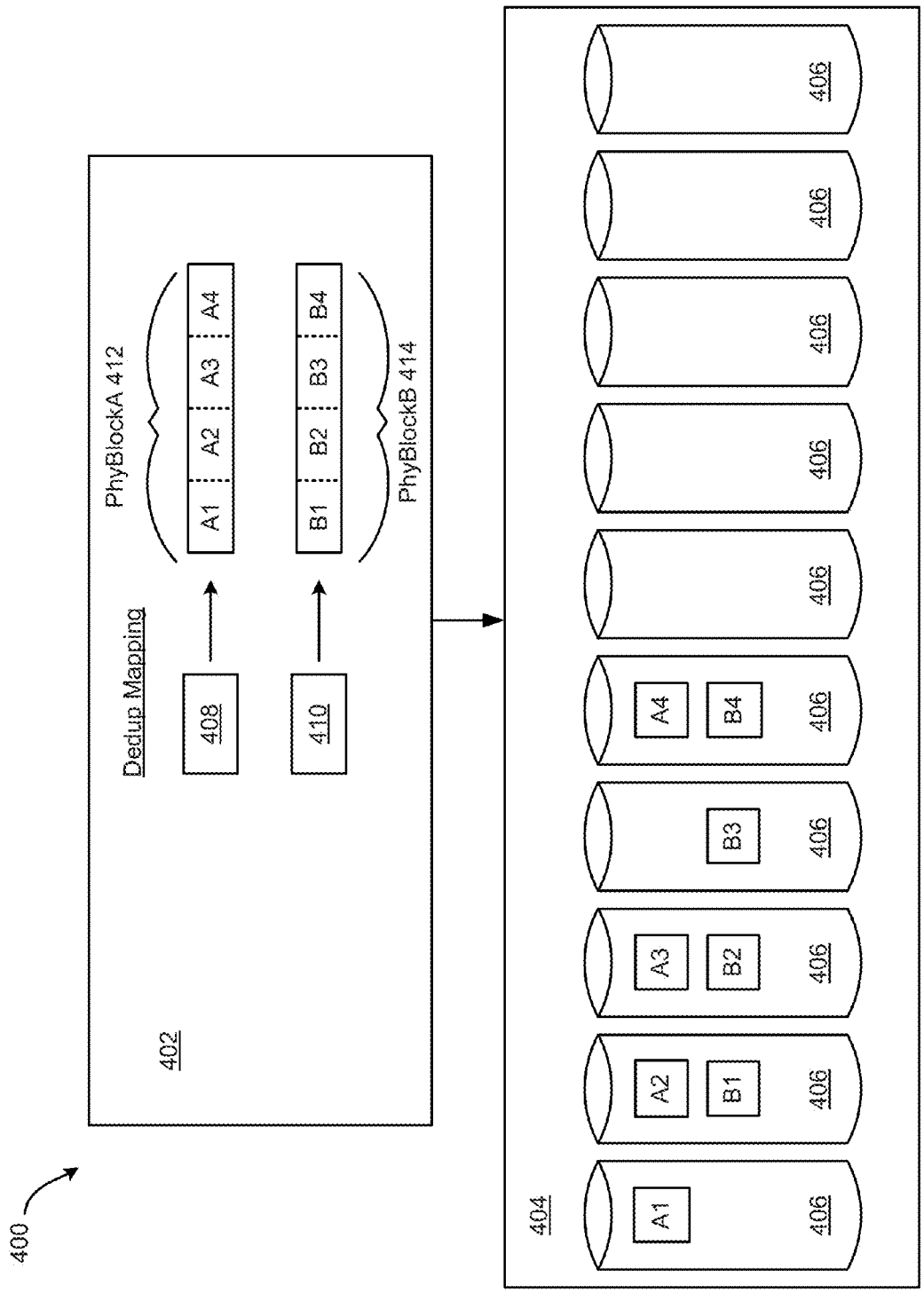
FIG. 4 illustrates a schematic of data storage environment according to one embodiment.

Now referring now to FIG. 4, a schematic of a data storage environment 400 is shown according to one embodiment. As an option, the data storage environment 400 may be implemented in conjunction with features from any other embodiment listed herein, such as those described with reference to the other FIGS. Of course, the data storage environment 400 and others presented herein may be used in various applications and/or in permutations which may or may not be specifically described in the illustrative embodiments listed herein.

As shown in FIG. 4, the data storage environment 400 includes a deduplication layer/engine 402, and a storage pool 404. The storage pool 404 includes a plurality of computer readable storage media 406, e.g. hard disks. For simplicity, the computer readable storage media 406 shown in FIG. 4 comprises hard disk media. It is important to note, however, that the computer readable storage media 406 is in no way limited to hard disk media, but may include other suitable as would be understood by one having skill in the art upon reading the present disclosure.

As shown in FIG. 4, the deduplication layer 402 is configured to implement a deduplication process, such as those described herein, wherein a received application block A (AppBlockA) 408 and a received application block B (AppBlockB) 410 may be mapped to physical block A (PhyBlockA) 412 and physical block B (PhyBlockB) 414, respectively.

As also shown in FIG. 4, the deduplication layer 402 is physically and/or functionally and/or logically separate from the storage pool 404 (e.g. the deduplication layer 402 may work above the storage pool 404). Accordingly, the deduplication layer 402 may act as an application with respect to the storage pool 404, and thus will see blocks A1-A4 as one big physical block (PhyBlockA 412). Similarly, the deduplication layer 402 will see blocks B1-B4 as one big physical block (PhyBlockB 414). The deduplication layer 402 may not have access to the individual disk blocks, but may have access at the block row level in some approaches. Accordingly, as the deduplication is performed at the application block level—thus implementing a larger deduplication block size as compared to deduplication at the individual disk block level this may result in the presence of more duplicate data ultimately stored in the storage pool; thus reducing the advantage of the deduplication mechanism.

The storage pool 404 virtualizes AppBlockA 408 and AppBlockB 410, each of which have 4 data blocks associated therewith, these blocks being internally stored in the storage pool 404. Specifically, PhyBlockA 412 (to which AppBlockA 408 is mapped to) is internally divided into 4 data blocks (A1, A2, A3, A4) in the storage pool 404. Similarly PhyBlockB 414 (to which AppBlockB 410 is mapped to) is internally divided into 4 data blocks (B1, B2, B3, B4) in the storage pool 404. This division is not visible to the deduplication layer 402 and/or the application.

As shown in FIG. 4, the 4 data and blocks of PhyBlockA 412 are stored on 4 different disks 406 in the storage pool 404. Additionally, the data blocks of AppBlockB 414, totaling 4, are stored on 4 different disks 406. As illustrated in FIG. 4, while each of the blocks from PhyBlockA 412 are stored on distinct disks with respect to each other, some or all of these blocks may be stored on the same disk as a block associated with PhyBlockB 414.

In one embodiment, the storage pool 404 may include a processor (not shown) and logic ("storage pool logic") integrated with and/or executable by the processor, the logic being configured to perform various operations. For example, the storage pool logic may include erasure logic, which may generate one or more parity blocks associated with data blocks of PhyBlockA 412 and PhyBlockB 414.

As also shown in FIG. 4, the data and parity blocks of PhyBlockA 412, totaling 6, are stored on 6 different disks 406. Additionally, the data and parity blocks of AppBlockB 414, totaling 6, are stored on 6 different disks 406. As illustrated in FIG. 4, while each of the blocks from PhyBlockA 412 are stored on distinct disks with respect to each other, some or all of these blocks may be stored on the same disk as a block associated with PhyBlockB 414.

Now referring to FIGS. 5A-5D, an illustration of the efficiency of deduplication based on different deduplication block sizes is shown, according to various embodiments. Data deduplication may operate at the application block level, the block level, the byte level, etc., thus defining the minimal data fragment that may checked for redundancy. A deduplication block size, as used herein, is therefore the size of the minimal fragment data that is checked for redundancy (e.g. that is deduplicated). As mentioned above, when a deduplication engine configured to implement a known deduplication process is placed above, e.g. is physically and/or functionally and/or logically separate from, a storage pool, more duplicate data may result as the deduplication may be performed at an application block level. In contrast, a deduplication engine placed within, e.g. is physically and/or functionally and/or logically a part of, a storage pool, less duplicate data may result as the deduplication may be performed at the individual disk level. Typically, the larger the size of the deduplication block (the size of the block, e.g. an application block, an individual block within the application, etc., upon which deduplication is to be performed), there may be less chance of finding duplicate data.

Figure 5A:
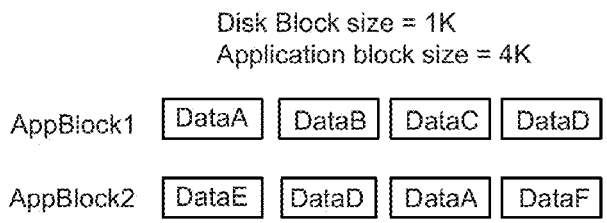
FIGS. 5A-5D illustrate various embodiments of deduplication using varying deduplication block sizes.

The relationship between deduplication efficiency (e.g. reducing redundant data) and deduplication block size is illustrated with regard to the two application blocks AppBlock1 and AppBlock2, shown in FIGS. 5A-5D. As shown in FIG. 5A, the size of each application block is 4K, whereas the size of each disk in the storage pool is 1K. Accordingly, AppBlock1 will be split into 4 data blocks (DataA, DataB, DataC, DataD), each of which may be stored and/or mapped to 4 disks in the storage pool. Similarly, AppBlock2 will be split into 4 data blocks (DataE, DataD, DataA, DataF), each of which may also be stored and/or mapped to 4 disks in the storage pool. As also shown in FIG. 5A, AppBlock1 has two data blocks that are identical to two of the data blocks of AppBlock2, i.e. DataA and DataD.

Figure 5B:
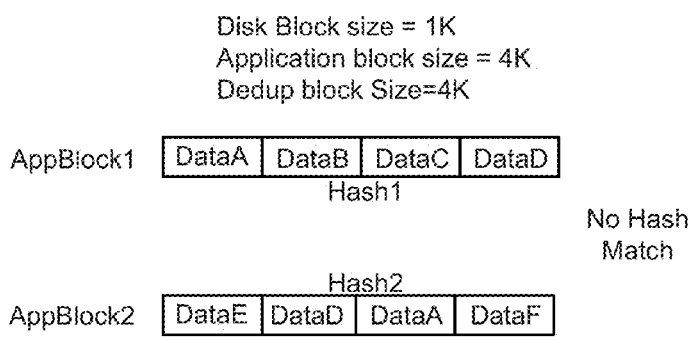

FIG. 5B provides an example where the deduplication block size is 4K. Accordingly, in this example, 4K represent the minimum size of a data fragment that will be checked for redundancy. Per a deduplication process, such as those described herein, a single hash value, hash1, with be generated for AppBlock1, and a single hash value, hash2, will be generated for AppBlock2, where each hash value uniquely identifies 4K of data content associated with its respective application block. As hash1 and hash2 are not a match, each of the 4 data blocks associated with AppBlock1 and each of the 4 data blocks associated with AppBlock2 may be written to and/or stored on computer readable storage media in a storage pool, thereby resulting in redundant/duplicate copies of data (e.g. DataA and DataD) in the storage pool.

Figure 5C:
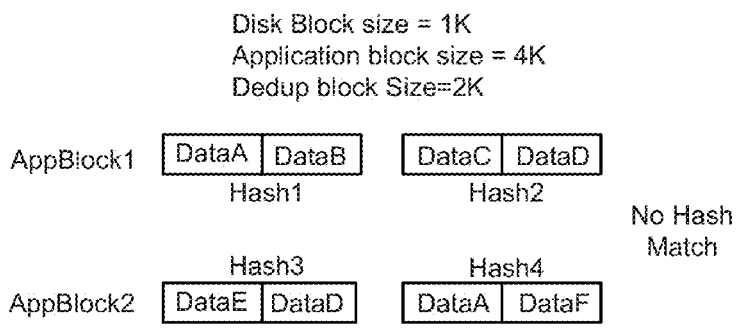

FIG. 5C provides another example where the deduplication block size is 2K. Accordingly, per a deduplication process, two hash values (hash3 and hash4) will be generated for AppBlock1, where each hash uniquely identifies data content associated with a 2K subunit of AppBlock1. Similarly, two hash values (hash5 and hash6) will be generated for AppBlock2, where each hash uniquely identifies data content associated with a 2K sub-unit of AppBlock2. As none of the 4 generated hash values match, each of the 4 data blocks associated with AppBlock1 and each of the 4 data blocks associated with AppBlock2 may be written to and/or stored in computer readable storage media in a storage pool. Thus, where the deduplication block size is 2K as illustrated in FIG. 5C, redundant copies of data (DataA and DataD) may still be present in the storage pool.

Figure 5D:
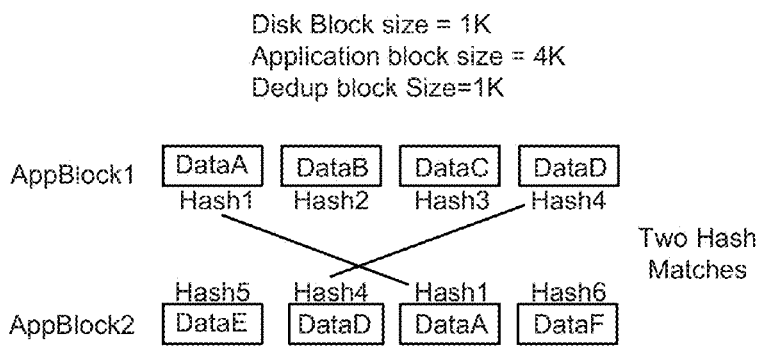

FIG. 5D provides yet another example where the deduplication block size is 1K, the same size as each of the computer readable storage media in a storage pool. Accordingly, per a deduplication process, four hash values (hash7, hash8, hash9, hash10) will be generated for AppBlock1, where each hash uniquely identifies data content associated with a 1K subunit of AppBlock1. Similarly, four hash values (hash11, hash10, hash7, hash12) will be generated for AppBlock2, where each hash uniquely identifies data content associated with a 1K subunit of AppBlock2.

As the deduplication block size in FIG. 5D is the same as the size of the computer readable storage media, there is a greater possibility of finding duplicate data (i.e. data that has matches hash values). For instance, as shown in FIG. 5D, the 1K subunit of AppBlock1 comprising DataA and the 1K sub-unit of AppBlock2 comprising DataA have matching hash values (hash7) and are thus duplicates. Moreover, the 1K subunit of AppBlock1 comprising DataD and the 1K sub-unit of AppBlock2 comprising DataD have matching hash values (hash10) and are also duplicates. As discussed previously, deduplication allows the removal of redundant data. Accordingly, only one copy of DataA may be written and/or stored in the storage pool, with the duplicate thereof replaced with a reference/pointer to the one stored copy of DataA. Additionally, only one copy of DataD may be written and/or stored in the storage pool, with the duplicate thereof replaced with a reference/pointer to the one stored copy of DataD. This may result in about a 20% optimization in storage.

Figure 6:
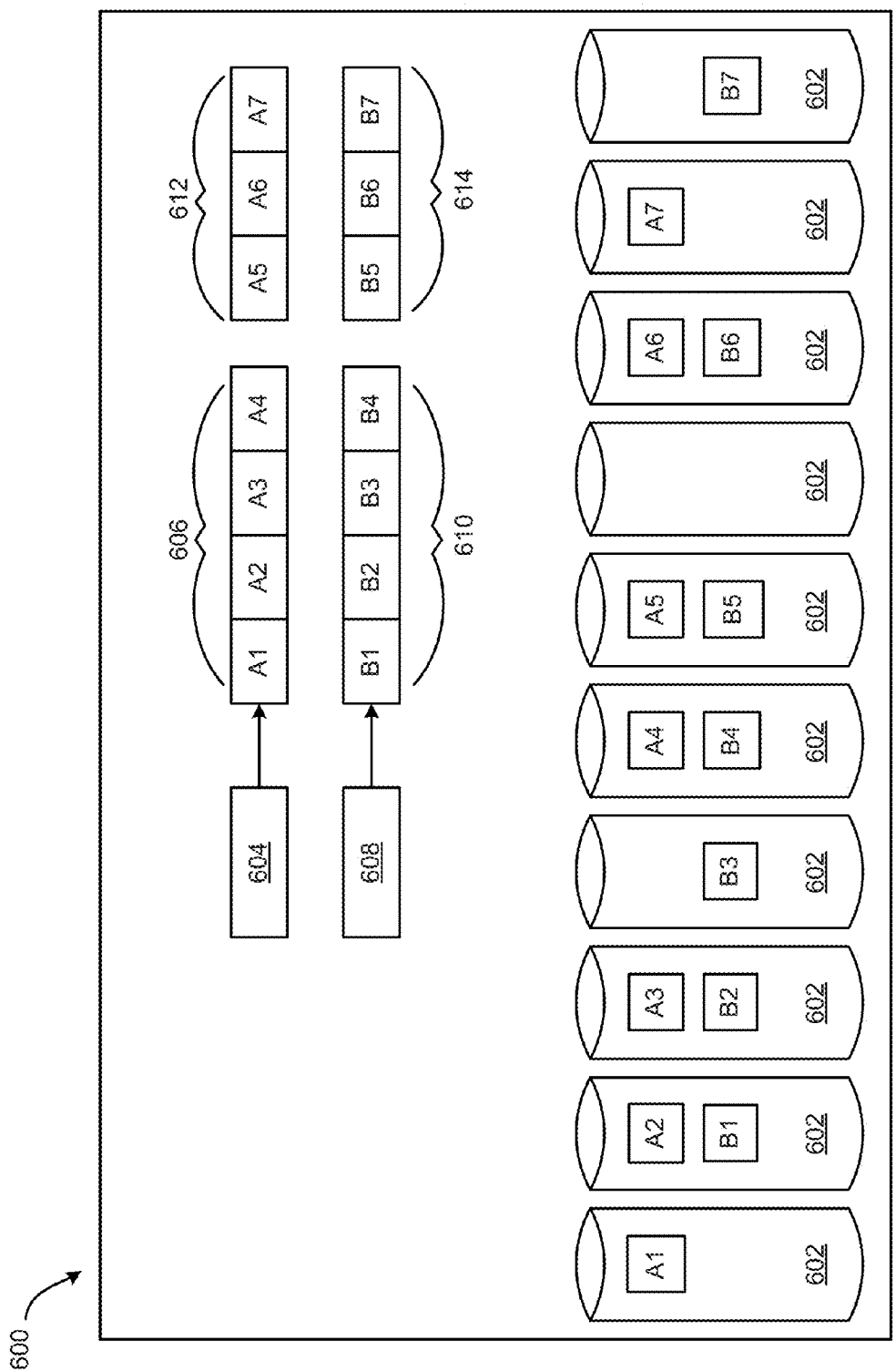
FIG. 6 illustrates a schematic of a storage pool according to one embodiment.

Referring now to FIG. 6, a schematic of a storage pool 600 is shown according to one embodiment. As shown in FIG. 6, the storage pool includes a plurality of computer readable storage media 602. In some approaches, the plurality of computer readable storage media may comprise hard disk media (e.g., configured as a DASD, RAID, JBOD, etc.), solid state storage media (e.g., EEPROM (Electrically Erasable Programmable Read-Only Memory), flash memory, flash disk, storage-class memory (SCM)), electronic memory, magnetic tape media, tape cartridges, etc. For simplicity, the computer readable storage media 602 shown in FIG. 6 is assumed to comprise hard disk media. It is important to note, however, that the computer readable storage media 602 is in no way limited to hard disk media, but may include other suitable storage media as would be understood by one having skill in the art upon reading the present disclosure.

In one embodiment, the storage pool 600 may include a processor (not shown) and logic ("storage pool logic") integrated with and/or executable by the processor, the logic being configured to perform various operations. For example, in one embodiment, this storage pool logic may be configured to divide application block A (AppBlockA) 604 into 4 data blocks (A1, A2, A3, A4) 606 spread across one or more disks 602 at the storage pool level. Similarly, the storage pool logic may be configured to divide application block B (AppBlockB) 608 into 4 data blocks (B1, B2, B3, B4) 610 across one or more disks 602 at the storage pool level.

The division of AppBlockA 604 and AppBlockB 608 may be based, in part, on the size of the application blocks and the size of each disk 602 in the storage pool 600, in some approaches. For example, the size of both application blocks (604 and 608) may be 4 k, whereas the size of each disk 602 may be 1K. Accordingly, each application block (604 and 608) may be divided into 4 blocks spread over 4 distinct disks 602. Moreover, in numerous approaches, the division of AppBlockA 604 and AppBlockB 608 may not be visible to the application block and/or application.

In another embodiment, the storage pool logic may include erasure code logic. Such erasure code logic may allow any number of parity blocks for the data blocks of an application block. The number of parity blocks may be determined/decided by an administrator, a user, operating conditions, an algorithm, etc. For example, in various approaches an administrator may desire to have 3 parity blocks associated with an application block, such as the case in FIG. 6. As shown in FIG. 6, the data blocks of AppBlockA 604 are associated with 3 parity blocks (A5, A6, A7) 612; likewise, the data blocks of AppBlockB 608 are associated with 3 parity blocks (B5, B6, B7) 614. It is important to note that while 3 parity blocks are shown to be associated with the data blocks of each application block, this number of parity blocks is in no way limiting and is presented for illustrative purposes only.

As also shown in FIG. 6, the data and parity blocks of AppBlockA 604, totaling 7, are stored on 7 different disks 602. Additionally, the data and parity blocks of AppBlockB 608, totaling 7, are stored on 7 different disks 602. As illustrated in FIG. 6, while each of the blocks from AppBlockA 604 are stored on distinct disks with respect to each other, some or all of these blocks may be stored on the same disk as a block associated with AppBlockB 608.

Per the erasure code logic, AppBlockA 604 and AppBlockB 608 may each sustain up to 3 disk failures. In other words, recovery of the original data associated with AppBlockA 604 and AppBlockB 608 may be obtained using at least 4 blocks associated with each application block.

In some approaches, a deduplication engine/layer (not shown in FIG. 6) may be located physically and/or functionally and/or logically within the storage pool 600. This deduplication engine/layer may be configured to implement deduplication processes at the disk block level, such as inline deduplication, post-processing deduplication, etc. For instance, with inline deduplication, new data (e.g. an application block) may be received (e.g. from an application), and the deduplication engine may split the received application block into a plurality of blocks. Each block may then be processed using a hash algorithm, including, but not limited to MD5, SHA-1, or other suitable hash algorithm as would be understood by one have skill in the art upon reading the present disclosure. The generated hashes may next be compared to hash values associated with existing blocks already stored in the storage pool, where such comparison may be made by referencing an in-memory mapping table in some approaches. Where duplicate blocks are identified, e.g. a block whose generated hash value matches the hash value for an existing block stored in the storage pool, the deduplication engine/layer may store and/or communicate a reference/pointer to the existing block instead of communicating and/or storing the duplicate block in the storage pool. Non duplicate block, e.g. blocks with no matching hash values, may be communicated and/or stored to the storage pool. As the deduplication may be implemented for each received application block, blocks stored in the storage pool may be shared (e.g. referenced by) one or more application blocks in various approaches. Additionally, with regard to post-processing deduplication techniques, any duplicates of a given block that are already stored in the storage pool may be deleted (or marked as free), and replaced with a reference to the one remaining instance of the block.

It is important to note, however, that there may be disadvantages associated with deduplication in an erasure code environment, e.g. where a deduplication layer is located inside/within or is a part of the storage pool. For example, implementation of low level deduplication at the disk block level may result in destroying or reducing the reliability associated with erasure code semantics. For example, suppose that a deduplication engine is physically, functionally and/or logically within the storage pool 600 described in FIG. 6. With regard to AppBlockA 604, recovery of the original data associated with AppBlockA 604 requires at least 4 out of the 7 total blocks. As each of the 7 blocks (e.g. the 4 data blocks A1-A4, and the 3 data blocks A5-A7) are stored on 7 different disks, there is a guaranteed reliability of sustaining up to 3 disk failures. However, by way of example only, suppose instead that blocks A1 and A7 are placed on a first disk ("disk 1) due to a deduplication process, and the 5 remaining blocks (A2, A3, A4, A5, A6) are stored on 5 other disks ("disks 2-6", respectively); such that there are 6 total disks on which the blocks of AppBlockA 604 are stored. If disk 1, disk 2 and disk 3 were to fail (for a total of 3 disk failures), this would result in the loss of 4 blocks (A1, A2, A3, A7). As only 3 blocks remain (not the at least 4 blocks required for complete data recovery), the original data associated with AppBlockA 604 cannot be recovered. Thus, the guarantee of sustaining 3 disk failures will not be met in such a case. While conventional deduplication-erasure code environments may add one or more additional parity blocks to a unique disk (e.g. a disk to which no other block from AppBlockA 604 is written and/or stored) in the storage pool to maintain reliability, this may introduce additional storage overhead.

Moreover there may be additional disadvantages for deduplication in an erasure code environment. For instance, consider the case where the computer readable storage media 602 described in FIG. 6 comprised comprises hard disk media configured as a redundant array of independent disks (RAID). Again with reference to AppBlockA 604, suppose, as well, that blocks A1 and A2 are placed on a first disk ("disk 1) due to a deduplication process, and the 5 remaining blocks (A3, A4, A5, A6, A7) are stored on 5 other disks ("disks 2-6", respectively). There may be problems associated with the performance overhead during a read of AppBlockA 604. In particular, as data blocks A1 and A2 are part of the same disk, these blocks will be read serially; thus, the parallel read performance of the blocks associated with AppBlockA 604 guaranteed by RAID semantics will not be met. In other words, the purpose of erasure code striping in a RAID architecture may be thwarted, resulting in decreased performance.

Embodiments disclosed herein overcome the aforementioned drawbacks by providing a system, method and computer program product for improving the placement of blocks, e.g. data blocks and parity blocks, in a deduplication-erasure code environment while ensuring erasure code semantics. For example, in several preferred embodiments, improved placement of blocks in a deduplication-erasure code environment while maintaining erasure code semantics may include preserving disparate locations for the blocks. Additionally, improving the placement of blocks in a deduplication environment while maintaining erasure code semantics may also increase the probability of deduplication for future writes, in some embodiments. Further, in exemplary embodiments, the deduplication-erasure code environment may comprise a deduplication engine/layer implemented inside a storage pool.

For instance, in some approaches, for a disk block set referenced by an application block, a check may be performed to determine whether duplicate blocks are already stored on computer readable storage media in a storage pool, where duplicate blocks are blocks having a hash value matching a hash value of a block in the block set. The disk block set may comprise one or more data blocks and one or more parity blocks.

In additional approaches, each of the computer readable storage media (e.g. each computer readable storage medium) in the storage pool may be assigned a disk affinity value. For each block in the block set that has no duplicates thereof, the block may be written to a computer readable storage medium based on the disk affinity value of and/or an affinity value calculated for the block.

In approaches where a block in the block set has a duplicate thereof that is stored on a computer readable storage medium on which no other block from the block set is written to and/or stored, the block may be mapped to its respective duplicate. Such approaches may aid in preventing the duplication of data across the computer readable storage media, thus ensuring erasure code semantics.

In other approaches where two blocks in the block set have duplicates thereof that are stored on the same computer readable storage medium, one of the blocks in the block set may be mapped to its respective duplicate on that same computer readable storage medium. The other block in the block set may then be written to a distinct computer readable storage medium on which no other block in the block set is written to and/or stored, and its respective duplicate replaced with a reference/pointer to the newly written block. Such approaches may aid in increasing the deduplication of future writes to the computer readable storage media in the storage pool.

Figure 7A:
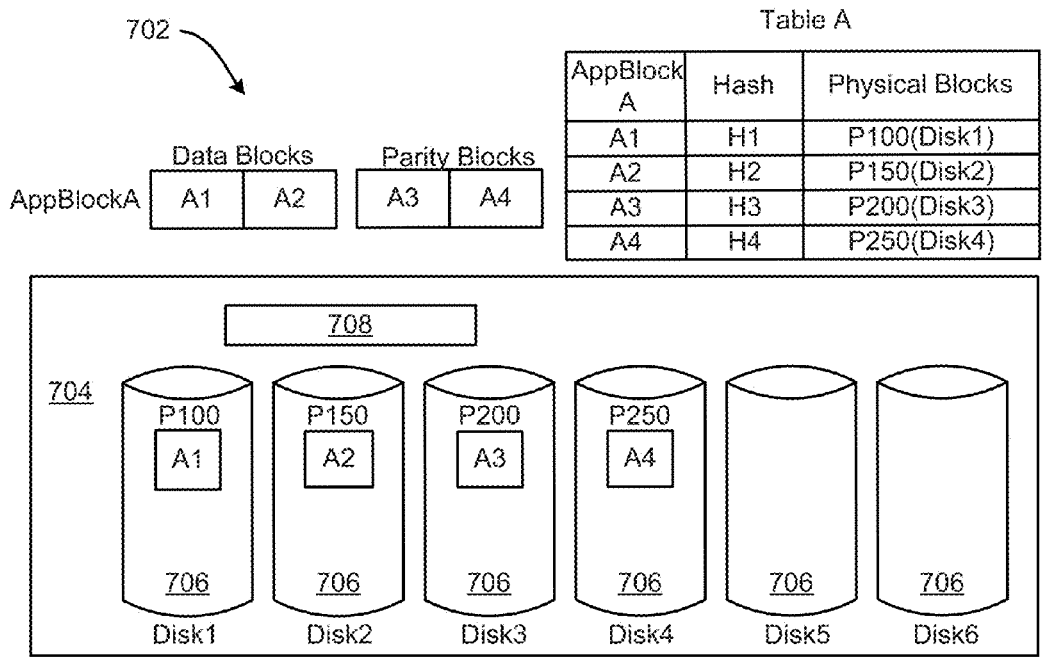
Figure 7B:
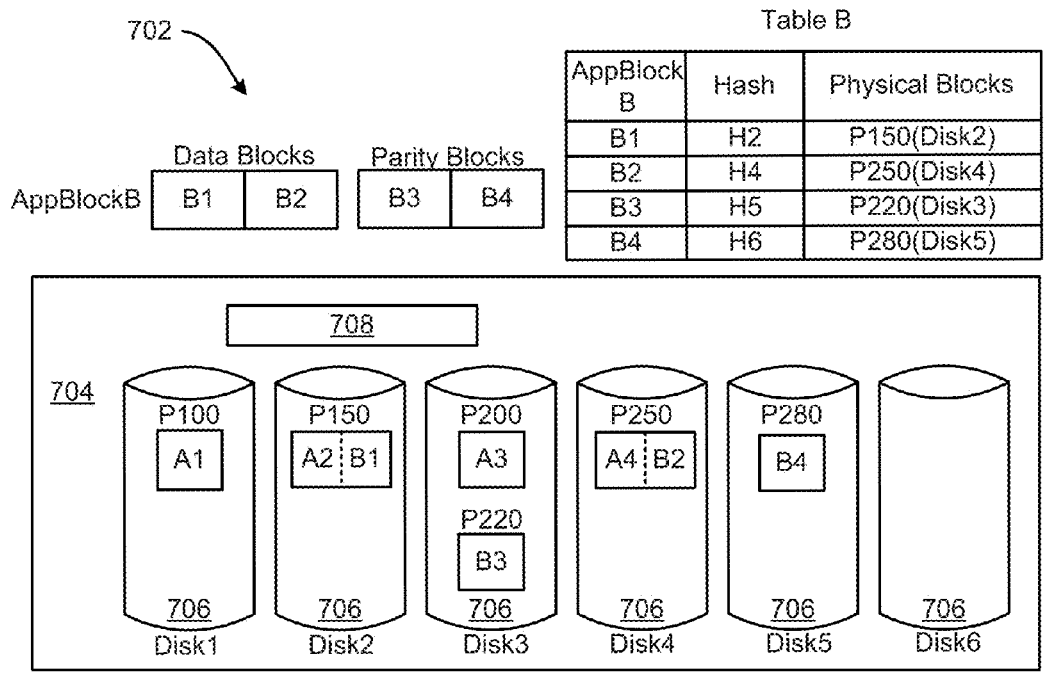

FIGS. 7A-7C graphically illustrate a method for improving the placement of blocks, e.g. data blocks and parity blocks, in a deduplication-erasure code environment while ensuring erasure code semantics. Of course, more or less operations than those shown in FIGS. 7A-7C may be included in method, as would be understood by one of skill in the art upon reading the present descriptions.

Each of the steps of the method may be performed by any suitable component of the operating environment. For example, in various non-limiting embodiments, the method may be partially or entirely performed by a processor, such as a central processing unit (CPU), an application specific integrated circuit (ASIC), a field programmable gate array (FPGA), etc., which may be embedded in and/or operate within a system, an apparatus, a drive, a storage device, etc., and which may have logic embedded with and/or accessible to the processor.

With reference first to FIG. 7A, a deduplication-erasure code environment 702 receives application block A (AppBlockA). This erasure-deduplication environment 702 comprises a storage pool 704 comprising computer readable storage media 706. For simplicity, the computer readable storage media 706 comprises hard disk media. It is important to note, however, that the computer readable storage media 706 is in no way limited to hard disk media, but may include other suitable storage media as would be understood by one having skill in the art upon reading the present disclosure.

In various approaches, the storage pool 704 may be configured to implement redundancy parity encoding (erasure code), which generates one or more parity blocks associated with data blocks of a given application block.

Moreover, the storage pool 704 may also include a deduplication engine 708 which is physically and/or functionally located within, e.g. is a part of, the storage pool 704. The deduplication engine 708 may be configured to implement a deduplication process, such as those described herein.

With continued reference to FIG. 7A, parity blocks (A3 and A4) are associated with the data blocks (A1 and A2) of AppBlockA. The contents of blocks A1, A2, A3 and A4 are then hashed, e.g. by the deduplication engine 708, resulting in hash values H1, H2, H3 and H4 respectively. Blocks A1-A4 are then written to and/or stored upon physical blocks associated with disks 706. See Table A. For example, block A1 is written to and/or stored upon physical block P100, which is located on disk1; block A2 is written to and/or stored upon physical block P150 located on disk2; block A3 is written to and/or stored upon physical block P200 located on disk3; and block A4 is written to and/or stored upon physical block P250 located on disk3. The labels "P100, P150, P200 and P250" correspond to a physical block identifier (PhyBlockID), which describes a location of the physical blocks on the disks. The labels "disk1, disk2, disk3 and disk4" correspond to a disk identifier (DiskID).

Now referring to FIG. 7B, the deduplication-erasure code environment 702 receives application block B (AppBlockB). Parity blocks (B3 and B4) are associated with the data blocks (B1 and B2) of AppBlockB. The contents of blocks B1, B2, B3 and B4 are then hashed, e.g. by the deduplication engine 708, resulting in hash values H2, H4, R5 and H6 respectively. The generated hash values identifying the contents of blocks B1-B4 are then compared to the hash values associated with blocks A1-A4 already stored on disks 706. In some approaches, the comparison between the generated hash values and the hash values associated with blocks already stored on disks 706 may be implemented by the deduplication engine 708. In more approaches, this comparison may be implemented by referencing a deduplication mapping table created and/or maintained by the deduplication engine 708.

As illustrated in FIG. 7B, the hash value of block B1 (hash2) matches the hash value of block A2, which is already written to and/or stored on P150 of disk2. Accordingly, A2 may be considered a duplicate of block B1. Additionally, the hash value of block B2 (hash4) matches the hash value of block A4, which is already written to and/or stored on P250 of disk4. Accordingly, block A4 may be considered a duplicate of block B2. The two duplicate blocks (A2 and A4) are located on different disks (e.g. disk2 and disk4, respectively); thus blocks B1 and B2 may be mapped to (e.g. replaced with a reference/pointer to pointing to) their respective duplicates (A2 and A4) without destroying the reliability guaranteed by erasure code semantics. For example, as AppBlockB comprises 2 data blocks and 2 parity blocks, per erasure code semantics, there is a guaranteed reliability of sustaining up to 2 disk failures. Provided each of the 4 disks are written and/or mapped to separate disks, the failure of 2 of these disks will only result in the loss of 2 blocks. As 2 other blocks associated with AppBlockB remain, the original data may be recovered, in accordance with the reliability guaranteed by the erasure code semantics.

As also illustrated in FIG. 7B, blocks B3 and B4 do not have hash values that match any of the hash values associated with blocks A1-A4 already stored on disks 706. Accordingly, blocks B3 and B4 may each be written to any disk that does not have any blocks associated with AppBlockB written and/or stored thereto. For example, blocks B3 and B4 may be written to any disk excluding disk2 and disk 4. In some approaches, each of the disks 706 may be assigned a disk affinity value. Additionally, affinity values for blocks B3 and B4 may be calculated using an affinity algorithm in conjunction with each block's respective hash value. Thus, in various approaches, blocks B3 and B4 may be written to disks that have matching affinity values. By way of illustration only, suppose B3 and B4 have calculated affinity values of 1 and 2, respectively. Reference to a disk affinity table may show that disk3 and disk5 have affinity values of 1 and 2, respectively.

Thus, based on this affinity value mapping, blocks B3 and B4 may be written to disks 3 and 5, respectively.

Now referring to FIG. 7C, the deduplication-erasure code environment 702 receives application block C (AppBlockC). Parity blocks (C3 and C4) are associated with the data blocks (C1 and C2) of AppBlockC. The contents of blocks C1, C2, C3 and C4 are then hashed, e.g. by the deduplication engine 708, resulting in hash values H3, H5, H7 and H8 respectively. The generated hash values identifying the contents of blocks C1-C4 are then compared to the hash values associated with blocks A1-A4, B3 and B4 already stored on disks 706. In some approaches, the comparison between the generated hash values and the hash values associated with blocks already stored on disks 706 may be implemented by the deduplication engine 708. In more approaches, this comparison may be implemented by referencing a deduplication mapping table created and/or maintained by the deduplication engine 708.

As illustrated in FIG. 7C, the hash value of block C1 (hash3) matches the hash value of block A3, which is already written to and/or stored on P200 of disk3. Accordingly, A3 may be considered a duplicate of block C1. Deduplication may be implemented for block C1, where block C1 is mapped to (e.g. replaced with a reference/pointer to pointing to) block A3. Additionally, the hash value of block C2 (hash5) matches the hash value of block B3, which is written to and/or stored on P200 of disk3. Accordingly, block B3 may be considered a duplicate of block C2. As there are two duplicates (A3 and B4) located on the same disk3, and C1 has already been mapped and/or written to its duplicate A3 block, mapping block C2 to its duplicate B3 block will destroy the reliability guaranteed by erasure code semantics. For example, as AppBlockC comprises 2 data blocks and 2 parity blocks, per erasure code semantics, there is a guaranteed reliability of sustaining up to 2 disk failures. However, if C1 and C2 are both assigned to disk3, and C3 and C4 are assigned to 2 different disks, failure of disk 3 and the disk upon which C3 or C4 is assigned, will result in the loss of 3 blocks. As only one other block from AppBlockC will remain, the original data may will not be able to be recovered, thus destroying the reliability guaranteed by the erasure code semantics.

With continued reference to FIG. 7C, to preserve the reliability guaranteed by the erasure code semantics, block C2 is written to P380 of disk6. This creates a redundancy of two blocks (C2 and B3) with the same hash H5 in the storage pool. Thus, block B3 may be deduplicated, e.g. block B3 may be replaced by a reference/pointer to that points to block C2, now written to P380 of disk6.

As also illustrated in FIG. 7C, blocks C3 and C4 do not have hash values that match any of the hash values associated with blocks already stored on disks 706. Accordingly, blocks C3 and C4 may each be written to any disk that does not have any blocks associated with AppBlockC written and/or stored thereto. For example, blocks C3 and C4 may be written to any disk excluding disk3 and disk 6, in some approaches, each of the disks 706 may be assigned a disk affinity value. Additionally, affinity values for blocks C3 and C4 may be calculated using an affinity function in conjunction with each block's respective hash value. Thus, in various approaches, blocks C3 and C4 may be written to disks that have matching affinity values.

Figure 8:
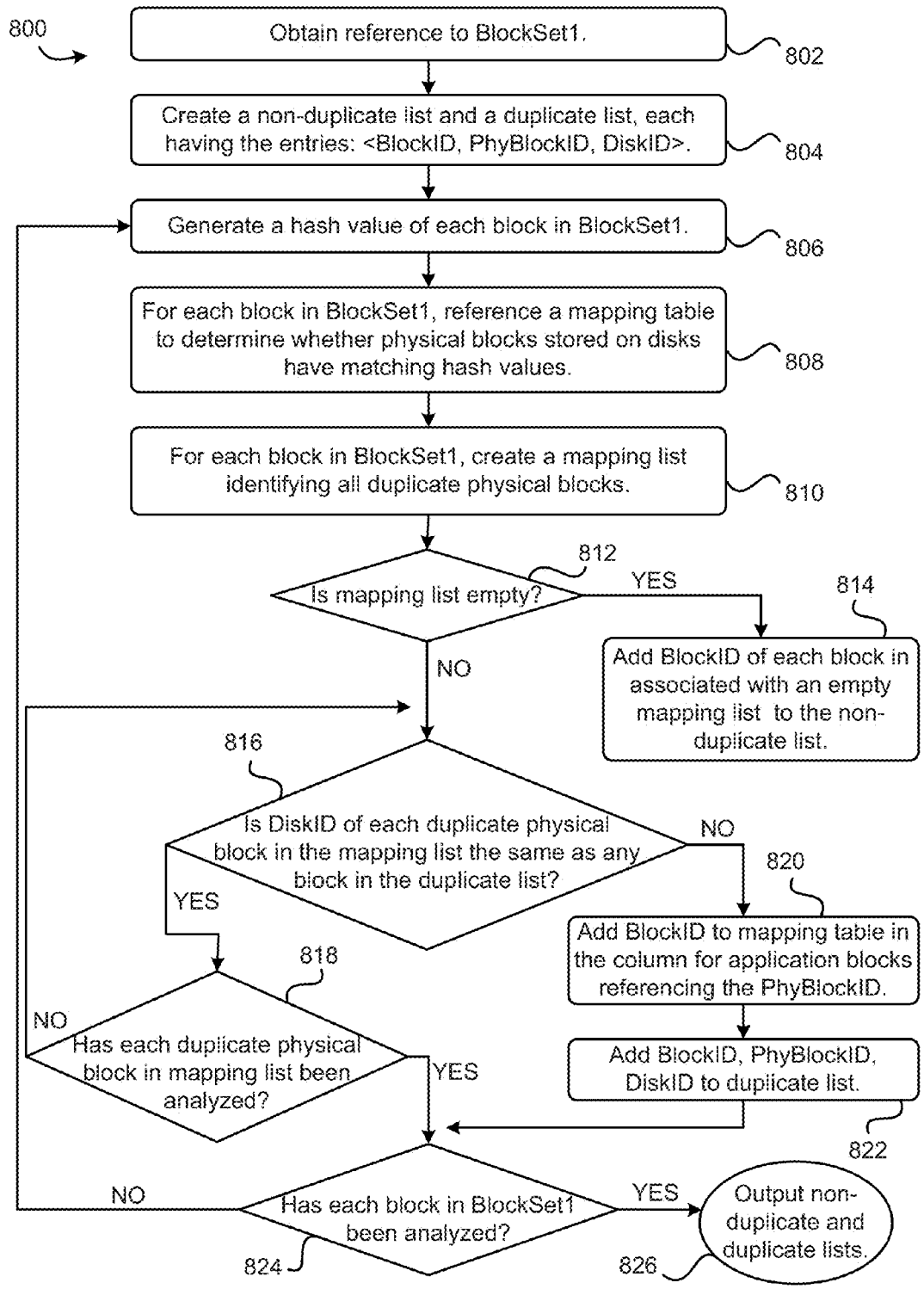
FIG. 8 illustrates a flowchart of a method for designating and/or processing duplicate blocks according to one embodiment.

Referring now to FIG. 8, a method 800 for designating and/or processing duplicate blocks is shown according to one embodiment. In various approaches, the method 800 may be implemented by a deduplication engine that is a physical, functional and/or logical part of a storage pool.

As an option, the present method 800 may be performed in accordance with the present invention in any of the environments depicted in the figures described herein, in various embodiments. Of course, more or less operations than those shown in FIG. 8 may be included in method 800, as would be understood by one of skill in the art upon reading the present descriptions.

Each of the steps of the method 800 may be performed by any suitable component of the operating environment. For example, in various non-limiting embodiments, the method 800 may be partially or entirely performed by a processor, such as a central processing unit (CPU), an application specific integrated circuit (ASIC), a field programmable gate array (FPGA), etc., which may be embedded in and/or operate within a system, an apparatus, a drive, a storage device, etc., and which may have logic embedded with and/or accessible to the processor.

As shown in FIG. 8, the method 800 may initiate with operation 802, where a reference to a block set (BlockSet1) is obtained, the BlockSet1 including one or more data blocks and one or more parity blocks. In various approaches, BlockSet1 is sent by an application. In some approaches, the number of parity blocks associated with the data blocks in BlockSet1 may be established by erasure code logic, which may be integrated with and/or executable by a processor embedded in and/or coupled to a storage pool.

In operation 804, a non-duplicate block list and duplicate block list is created to store information associated with the following entries: <BlockID, PhyBlockID, DiskID>. The entry "BlockID" refers to an identifier of one of the blocks in BlockSet1; the entry "PhyBlockID" refers to a physical block identifier, i.e. a description of the location of the physical block on a disk in a storage pool; and the entry "DiskID" refers to a disk identifier.

In operation 806, a hash value of each block in BlockSet1 is generated. For each block in the BlockSet1, a mapping table is referenced to determine whether physical blocks already stored on disks in the storage pool have hash values that match the generated hash value of the block, and thus are duplicates thereof. See operation 808. In numerous approaches, the mapping table may include information associated all physical blocks stored on the disks in the storage pool. For instance, in one approach the information may at least include a status of each physical block, the status indicating whether the physical block is allocated or free; a hash value of each physical block; a description of any application blocks referencing (e.g. pointing to) each physical block; a physical block identifier (PhyBlockID); and a disk identifier (DiskID). An exemplary mapping table is shown in FIG. 9, according to one approach.

In various approaches the information in the mapping table may be updated. For example, for any write request on an application block, a hash value for the write block may be generated. If the generated hash value matches any of the hash values of the physical blocks listed in the mapping table, the application block may be mapped to an allocated physical block with a matching hash value (e.g. a description of the application block referencing the allocated physical block with the matching hash value may be added to the mapping table). However, if the generated hash value does not match any of the hash values of the physical blocks listed in the mapping table, the application block may be assigned to a free physical block (i.e. a physical block having a status of free) in the mapping table, and a write for this physical block may be performed. It is important to note, that in preferred approaches, this mapping table includes DiskIDs for each physical block.

With continued reference to FIG. 8, for each block in BlockSet1, a mapping list is created from the referenced mapping table, wherein the mapping list identifies all the duplicate physical blocks (described by their PhyBlockIDs) having the same hash value as the block, as well as the respective DiskIDs of the duplicate physical blocks. See operation 810. Accordingly, this mapping list will have the following entries: <PhyBlockID, DiskID>.

In operation 812, a determination is made as to whether the mapping list associated with each block from BlockSet1 is empty? If so, the method 800 proceeds to operation 814; otherwise, the method 800 proceeds to operation 816.

In operation 814, a description (e.g. the BlockID) of each block in BlockSet1 that is associated with an empty mapping list is added to the non-duplicate block list. Specifically, these blocks are added below the entry "BlockID" in the non-duplicate block list.

In operation 816, for each block in BlockSet1 associated with a non-empty mapping list, a determination is made as to whether the diskID associated with each PhyBlockID in the respective mapping list is the same as a diskID of any of the blocks in the duplicate block list. If so, the method 800 proceeds to operation 818; otherwise, the method 800 proceeds to operation 820.

In operation 818, a determination is made as to whether each duplicate physical block in the mapping list has been analyzed, e.g. subject to operation 816. If so, the method 800 proceeds to operation 824; otherwise the method 800 proceeds back to operation 816.

In operation 820, for each block in BlockSet1 associated with a mapping table that includes a DiskID that is not the same as a DiskID of any block in the duplicate block list, the following information is added to the duplicate list: a description of the block in BlockSet1 (BlockID), the PhyBlockID, and the DiskID associated with the PhyBlockID. Specifically, this information is added below the entries "BlockID", "PhyBlockID" and "DiskID," respectively, in the duplicate block list. Additionally, in operation 822, the method 800 also includes updating the mapping table such that a description of the block (e.g. the BlockID) is added to the entry corresponding to any application blocks referencing (e.g. pointing to) the physical block with the PhyBlockID.

In operation 824, a determination is made as to whether each block in BlockSet1 has been analyzed, e.g. subject to operations 806 to 822 where relevant. If so, the method proceeds to operation 826; otherwise the method 800 proceeds back to operation 806.

In operation 826, the duplicate block list and the non-duplicate block list may be output.

Figure 10:
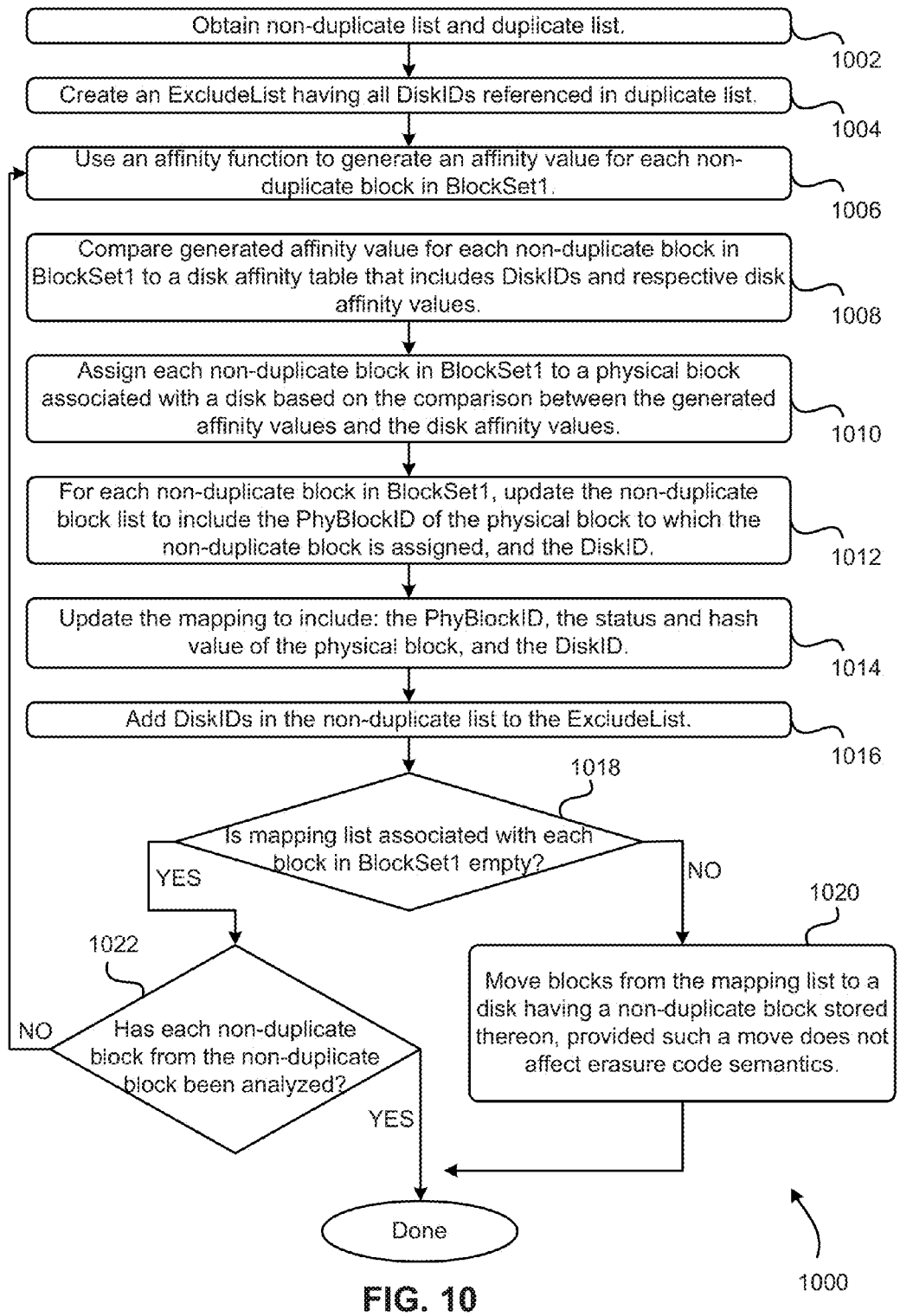
FIG. 10 illustrates a flowchart of a method for processing non-duplicate blocks according to one embodiment.

Referring now to FIG. 10, a method 1000 for processing non-duplicate blocks is shown according to one embodiment. In various approaches, the method 1000 may be implemented by a deduplication engine that is a physical, functional and/or logical part of a storage pool.

As shown in FIG. 10, the method 1000 may initiate with operation 1002, where the non-duplicate list and duplicate list associated with the blocks in BlockSet1 are obtained. In operation 1004, an ExcludeList is created, where the ExcludeList includes all the DiskIDs referenced in the duplicate list.

In operation 1006, an affinity function is implemented to generate an affinity value for each non-duplicate block in BlockSet1 that is listed in the non-duplicate block list. This affinity value may then be compared to a disk affinity table to determine whether any disks have physical blocks associated therewith that are allocated as free or are not overloaded. See operation 1008.

An exemplary affinity function is shown in FIG. 11, according to one approach. The affinity function shown in FIG. 11 is implemented with the argument set as the ExcludeList and the BlockID of the block. Moreover, an exemplary disk affinity value table ("Table 2") utilized by the affinity function described in FIG. 11, is provided in FIG. 12. As shown in FIG. 12, the disk affinity value table includes disk affinity values for each disk in the storage pool. For each disk entry in the disk affinity table, affinity values are stored in the descending order of preference. In various approaches, the Mod of the block in BlockSet1 may be matched with comma separated entries to determine whether the block may be placed on a disk. Further, in more approaches, entries in the disk affinity table may be based on the Mod logic and the affinity function described in FIG. 11. In even more approaches, entries in the disk affinity table may be decided by a user, administrator, etc. based on a selected affinity function, including but not limited to the affinity function illustrated in FIG. 11. It is important to note that the disk affinity values listed in FIG. 12 illustrate sample disk affinity values and are presented by way of example only.

With continued reference to FIG. 10, in operation 1010, each non-duplicate block in BlockSet1 may be assigned to a suitable physical block associated with a disk in the storage pool based on reference to the disk affinity table. In operation 1012, for each non-duplicate block in BlockSet1, the non-duplicate block list is updated to include a PhyBlockID corresponding to the physical block to which the non-duplicate block is assigned, as well as the DiskID associated with the disk upon which said physical disk is stored. Specifically, the description of the suitable physical block and the respective disk is added below the entries "PhyBlockID" and "DiskID," respectively, in the non-duplicate block list. Moreover, in operation 1014, the mapping table is updated such that the suitable physical block is assigned to the non-duplicate block, the status of the suitable block is marked as allocated, the hash value of the suitable physical block is set using the hash value of the non-duplicate block, and the DiskID associated with the suitable physical block is added.

In operation 1016, the DiskIDs in the non-duplicate list are added to the ExcludeList.

In operation 1018, a determination is made as to whether the mapping list (e.g. as described in FIG. 8) associated with each the block in BlockSet1 is empty? If so, the method 1000 proceeds to operation 1022; otherwise, the method 1000 proceeds to operation 1020.

In operation 1020, where the mapping list associated with each block in BlockSet1 is not empty, any of the blocks from the mapping list are moved to a disk that has a non-duplicate block from BlockSet1 stored thereon, provided such a move does not affect erasure code semantics.

In operation 1022, a determination is made as to whether each of the non-duplicate blocks from the non-duplicate block list have been analyzed, e.g. subject to operations 1006 to 1020 where relevant. If so, the method 1000 terminates; otherwise the method proceeds back to operation 1006.

Figure 13:
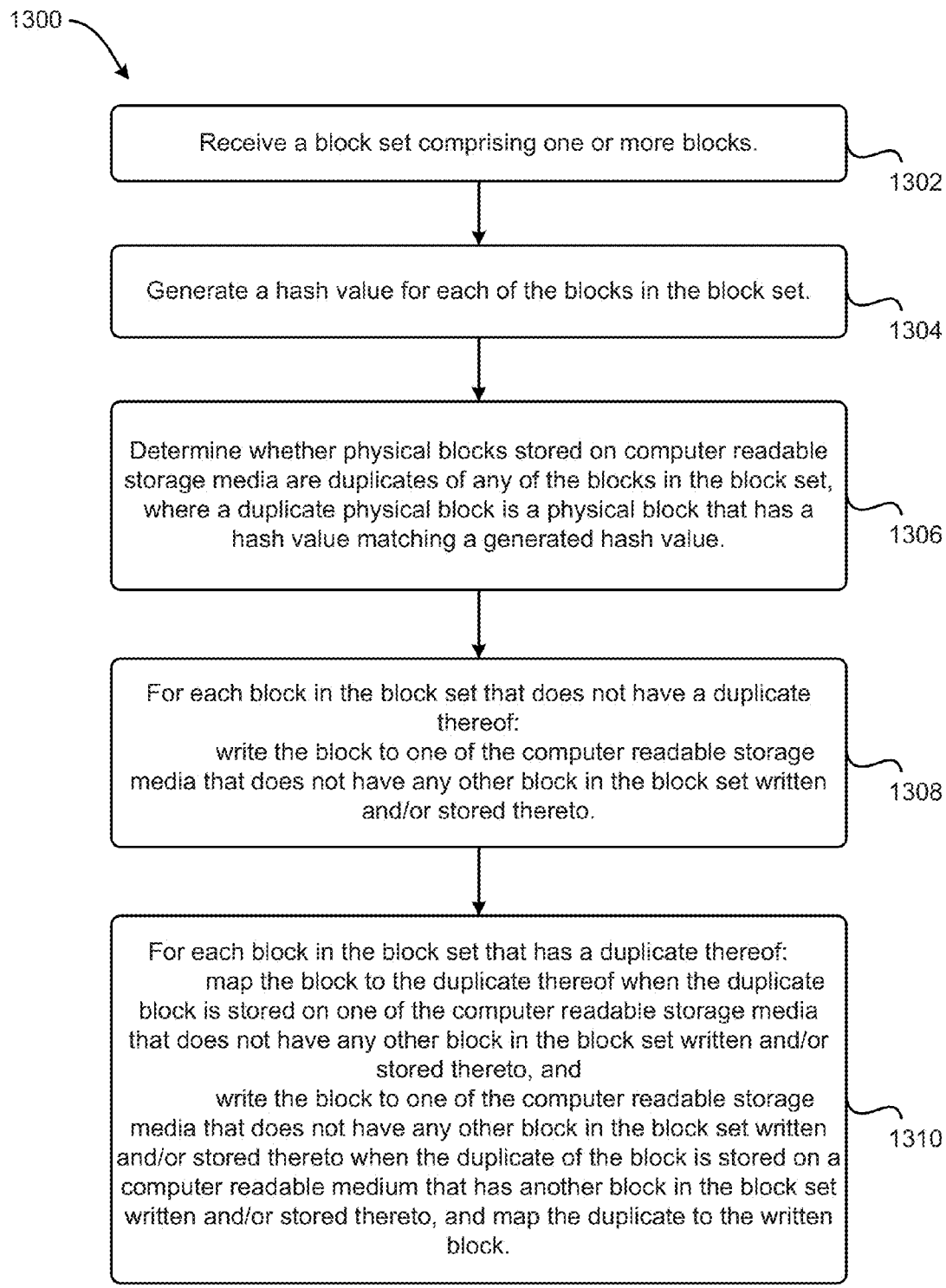
FIG. 13 illustrates a flowchart of a method according to one embodiment.

Referring now to FIG. 13, a method 1300 is shown according to one embodiment. As an option, the present method 1300 may be performed in accordance with the present invention in any of the environments depicted in the figures described herein, in various embodiments. Of course, more or less operations than those shown in FIG. 13 may be included in method 1300, as would be understood by one of skill in the art upon reading the present descriptions.

Each of the steps of the method 1300 may be performed by any suitable component of the operating environment. For example, in various non-limiting embodiments, the method 1300 may be partially or entirely performed by a processor, such as a central processing unit (CPU), an application specific integrated circuit (ASIC), a field programmable gate array (FPGA), etc., which may be embedded in and/or operate within a system, an apparatus, a drive, a storage device, etc., and which may have logic embedded with and/or accessible to the processor.

As shown in FIG. 13, a block set comprising one or more blocks may be received. See operation 1302. In some approaches, the block set may be received by a deduplication engine that may be physically, functionally and/or logically located within a storage pool. In other approaches, this deduplication engine may be physically, functionally and/or logically separate from the storage pool.

In one embodiment, the blocks associated with (e.g. "in") the block set may be referenced by an application block. In another embodiment, the blocks associated with the block set may include at least one data block and at least one parity block. In various embodiments where the blocks include at least one data block and at least parity block, the at least one parity block may added, and associated with the at least one data block, per logic configured to implement redundancy parity encoding (erasure coding). Such erasure code logic may be integrated with and/or executable by at least one processor coupled to a component in a deduplication-erasure code environment, such as a storage pool.

As also shown in FIG. 13, a hash value may be for each of the blocks in the block set. See operation 1304. In one embodiment, generation of these hash values may be implemented by a deduplication engine working within a combined deduplication erasure code environment, e.g. by a deduplication engine working within, not above and/or physically separate from, a storage pool.

The method 1300 further includes determining whether stored physical blocks are duplicates of any of the blocks in the block set, where a duplicate physical block is a physical block having a hash value that matched a generated hash value. See operation 1306.

According to one embodiment, determining whether the stored physical blocks are duplicates of any of the blocks in the block set may include referencing a mapping table. In various approaches, this mapping table may include information associated with all stored physical blocks, where such the information may at least include: a status of each physical block, the status indicating whether the physical block is allocated or free; a hash value of each physical block; a description of any application blocks referring to each physical block; a storage medium identifier (ID); and a physical block identifier (ID) for each physical block describing a location on the computer readable storage medium. Thus, in some approaches, determining whether the stored physical blocks are duplicates of any of the blocks in the block set may include referencing this mapping table to compare hash values of stored physical blocks with the generated hash values associated with each of the blocks in the block set.

With continued reference to FIG. 13, for each block in the block set that does not have a duplicate thereof, the block is written to one of the computer readable storage media that does not already have any other block in the block set written and/or mapped thereto. See operation 1308.

In some embodiments, the method may also include calculating an affinity value for each block in the block set that does not have a duplicate thereof. In some approaches, this affinity value may be calculated using an affinity function, such as that described in FIG. 12. In more embodiments, the method may include comparing the calculated affinity values to an affinity value table, which includes one or more affinity values associated with each of the computer readable storage media. In still more embodiments, the method may include assigning each block in the block set that does not have a duplicate thereof to a computer readable storage media that does not have any block from the block set written and/or mapped thereto based on the calculated affinity value.

As further shown in FIG. 13, for each block in the block set that has a duplicate thereof, the method 1300 will map the block to the duplicate thereof (e.g. to its respective duplicate) when the duplicate is on one of the computer readable storage media that does not have any other block in the block set written and/or mapped thereto. See operation 1310. In addition, when the duplicate is stored on a computer readable storage media that has another block in the block set written and/or mapped thereto, the method may write the block to a distinct one of the computer readable storage media that does not does not have any other block in the block set written and/or mapped thereto, and map the duplicate to the block written on the distinct one of the computer readable storage media. See also operation 1310.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided m the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
receiving a block set comprising one or more blocks, wherein the block set is referenced by an application block;
generating a hash value for each of the blocks in the block set;
determining whether physical blocks stored on computer readable storage media are duplicates of any of the blocks in the block set, wherein a duplicate physical block is a physical block that has a hash value matching a generated hash value; and for each block in the block set that has a duplicate thereof:
    map the block to the duplicate thereof when the duplicate is on one of the computer readable storage media that does not have any other block in the block set written and/or mapped thereto, and
    write the block to one of the computer readable storage media that does not have any other block in the block set written and/or mapped thereto when the duplicate of the block is stored on a computer readable storage media that has another block in the block set written and/or mapped thereto, and map the duplicate to the written block.

2. The method of claim 1, further comprising:
calculating an affinity value for each block in the block set that does not have a duplicate thereof; and
assigning each block in the block set that does not have a duplicate thereof to one of the computer readable storage media that does not have any other block in the block set written and/or mapped thereto based on the calculated affinity value.

3. The method of claim 2, further comprising:
comparing the calculated affinity value to an affinity value table, wherein the affinity value table comprises one or more affinity values associated with each of the computer readable storage media.

4. The method of claim 1, wherein determining whether the stored physical blocks are duplicates of any of the blocks in the block set comprises referencing a mapping table.

5. The method of claim 4, wherein the mapping table comprises information associated with the stored physical blocks, the information comprising:
    a status of each physical block, the status indicating whether the physical block is allocated or free,
    a hash value of each physical block,
    a description of any application blocks referring to each physical block,
    a storage medium identifier (ID), and
    a physical block identifier (ID) for each physical block describing a location on the computer readable storage medium.

6. The method of claim 1, wherein the computer readable storage media comprises hard disk media.

7. The method of claim 1, wherein the blocks in the block set comprise at least one data block and at least one parity block.

8. A system, comprising:
a plurality of computer readable storage media; and
a deduplication engine, the deduplication engine comprising a processor and logic integrated with and/or executable by the processor, the logic being configured to cause the processor to:
receive a block set comprising one or more blocks;
generate a hash value for each of the blocks in the block set;
determine whether physical blocks stored on computer readable storage media are duplicates of any of the blocks in the block set, wherein a duplicate physical block is a physical block that has a hash value matching a generated hash value;
for each block in the block set that does not have a duplicate thereof:
    write the block to one of the computer readable storage media that does not have any other block in the block set written and/or mapped thereto; and
for each block in the block set that has a duplicate thereof:
    map the block to the duplicate thereof when the duplicate is on one of the computer readable storage media that does not have any other block in the block set written and/or mapped thereto, and
    write the block to one of the computer readable storage media that does not have any other block in the block set written and/or mapped thereto when the duplicate of the block is stored on a computer readable storage media that has another block in the block set written and/or mapped thereto, and map the duplicate to the written block.

9. The system of claim 8, wherein the logic is further configured to:
calculate an affinity value for each block in the block set that does not have a duplicate thereof; and
assign the block to the one of the computer readable storage media that does not have any block in the block set written and/or mapped thereto based on the calculated affinity value.

10. The system of claim 8, wherein the logic is further configured to reference a mapping table to compare hash values of stored physical blocks with the generated hash values.

11. The system of claim 10, wherein the mapping table comprises information associated with the stored physical blocks, the information comprising:
    a status of each physical block, the status indicating whether the physical block is allocated or free,
    a hash value of each physical block,
    a description of any application blocks referring to each physical block,
    a storage medium identifier (ID), and
    a physical block identifier (ID) for each physical block describing a location on the computer readable storage medium.

12. The system of claim 8, wherein the computer readable storage media comprises hard disk media.

13. The system of claim 8, wherein the blocks in the block set comprise at least one data block and at least one parity block.

14. The system of claim 8, wherein the block set is referenced by an application block.

15. A method comprising:
obtaining information about a block set, wherein the information comprises one or more data blocks and one or more parity blocks in the block set;
generating a hash value for each of the blocks in the block set;
creating a non-duplicate list, a duplicate list, and a mapping list;
determining whether physical blocks stored on computer readable storage media are duplicates of any of the blocks in the block set, wherein a duplicate physical block is a physical block that has a hash value matching a generated hash value;
for each block in the block set that does not have a duplicate physical block:
    add the block to the non-duplicate list;
for each block in the block set that has a duplicate physical block:
    add the duplicate physical block and the computer readable storage medium on which the duplicate physical block is stored to the mapping list,
    determine whether the computer readable storage medium on which the duplicate physical block is stored is in the duplicate list, and
    in response to determining that the computer readable storage medium on which the duplicate physical block is stored is not in the duplicate list, add the block, the duplicate physical block and the computer readable storage medium on which the duplicate physical block is stored to the duplicate list; and outputting the non-duplicate list and the duplicate list.

16. The method of claim 15, wherein for each block in the non-duplicate list, the method further comprises:

calculating an affinity value for the block;

comparing the calculated affinity value to an affinity value table, wherein the affinity value table comprises one or more affinity values associated with each of the computer readable storage media; and assigning the block to a free physical block stored on one of the computer readable storage media based on the calculated affinity value, wherein the one of the computer readable storage media that does not have any other block in the block set written and/or mapped thereto.

17. The method of claim 16, wherein for each block in the non-duplicate list, the method further comprises: updating the non-duplicate list to include the physical block to which the block is assigned and the computer readable storage medium on which the assigned physical block is stored.

18. The method of claim 15, further comprising moving any duplicate physical block in the mapping list to the one of the computer readable media on which the block from the non-duplicate list is assigned with the proviso that the move does not affect erasure code semantics.

19. The method of claim 15, wherein determining whether the stored physical blocks are duplicates of any of the blocks in the block set comprises referencing a mapping table, wherein the mapping table includes:

a status of each stored physical block, the status indicating whether the physical block is allocated or free, a hash value of each stored physical block, a description of any application blocks referring to each stored physical block, a storage medium identifier (ID), and a physical block identifier (ID) for each physical block describing a location on the computer readable storage medium.

20. The method of claim 15, wherein the block set is referenced by an application block.

* * * * *